United States Patent
Ferguson

Patent Number: 5,911,163
Date of Patent: Jun. 8, 1999

[54] DUAL MODE VENT PLUG ASSEMBLY FOR AN ENCLOSED HOUSING

[75] Inventor: Walter J. Ferguson, Waterbury, Conn.

[73] Assignee: Dresser Industries, Inc., Dallas, Tex.

[21] Appl. No.: 08/959,603

[22] Filed: Oct. 28, 1997

Related U.S. Application Data

[63] Continuation-in-part of application No. 08/439,727, May 12, 1995.

[51] Int. Cl.[6] .................................. G01L 19/06
[52] U.S. Cl. .................................................. 73/738
[58] Field of Search ............................ 73/738, 756, 431

[56] References Cited

U.S. PATENT DOCUMENTS

| | | |
|---|---|---|
| 1,461,200 | 7/1923 | Strandell . |
| 2,522,007 | 9/1950 | Willach . |
| 3,473,563 | 10/1969 | Tatum . |
| 3,701,284 | 10/1972 | De Meyer . |
| 3,857,288 | 12/1974 | Neugebauer . |
| 3,874,241 | 4/1975 | Harland et al. . |
| 3,911,948 | 10/1975 | Collins et al. . |
| 3,938,393 | 2/1976 | Mogensen et al. . |
| 3,950,998 | 4/1976 | Murphy et al. . |
| 3,985,157 | 10/1976 | Ferguson . |
| 4,022,236 | 5/1977 | Dumont et al. . |
| 4,051,730 | 10/1977 | Andrews et al. . |
| 4,064,890 | 12/1977 | Collins et al. . |
| 4,214,486 | 7/1980 | Gorgens et al. ............................ 73/738 |
| 4,347,744 | 9/1982 | Buchanan ................................. 73/738 |
| 4,449,412 | 5/1984 | Fallon et al. . |
| 4,622,857 | 11/1986 | Nelson . |
| 5,012,678 | 5/1991 | Buchanan . |

FOREIGN PATENT DOCUMENTS

| | | |
|---|---|---|
| 2036498 | 12/1970 | France . |
| 90 03 096 U | 9/1990 | Germany . |
| 8902462 | 5/1991 | Netherlands . |

*Primary Examiner*—William Oen
*Attorney, Agent, or Firm*—Daniel Rubin

[57] ABSTRACT

A vent plug assembly for relieving overpressure from within an instrument casing and comprising a body adapted for secured placement within an aperture defined in the exterior wall of the casing and having a thru-bore and a blind recess symetrically spaced apart and of like configuration and internal cross-sectional dimension. A cooperating plug having a top plate and a pair of dependent stubs of like cross-sectional configuration and spacing as the thru-bore and recess of said body is interchangeably insertable within the thru-bore and recess of the body with one of the stubs defining a blind upward recess and the other of said stubs defining a thru-bore. The plug is interchangeably displaceable manually such that when the respective thru-bore of the body and plug are interfitted, continuous venting occurs while when the blind recess stub of the plug is inserted in the thru-bore of the body, venting occurs only at a predetermined value of pressure build-up from within the casing sufficient to expel the assembly from the installed aperture of the casing.

9 Claims, 2 Drawing Sheets

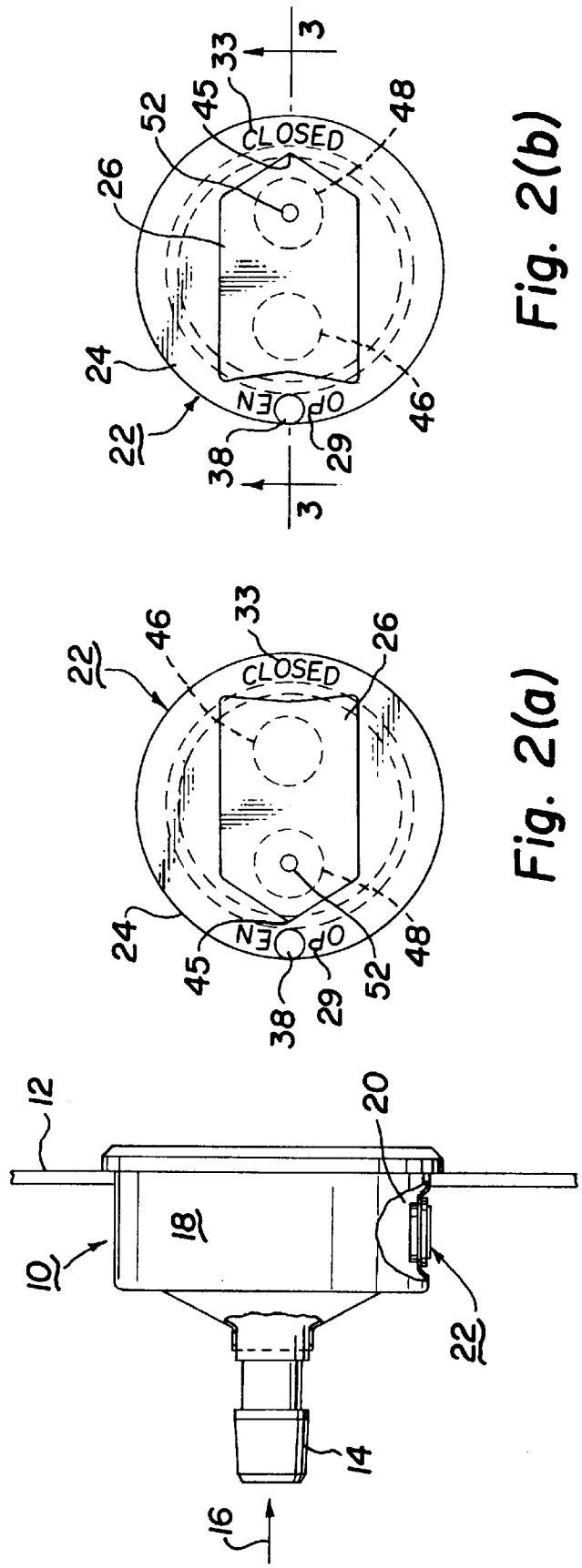

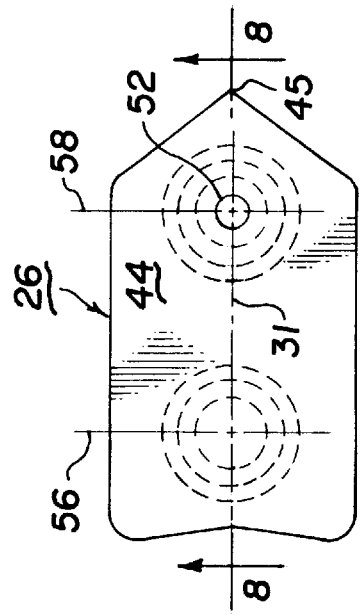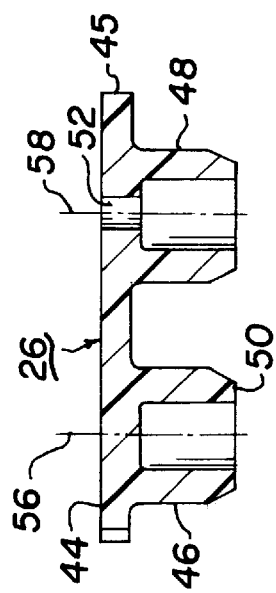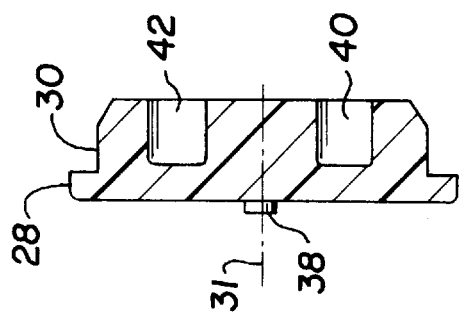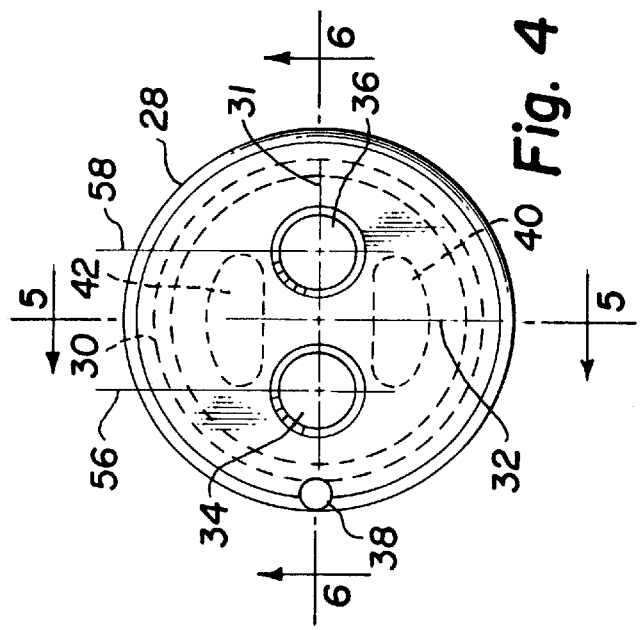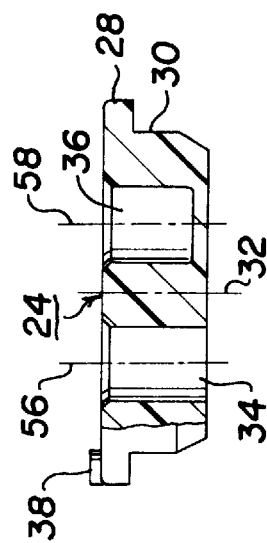

DUAL MODE VENT PLUG ASSEMBLY FOR AN ENCLOSED HOUSING

This application is a continuation-in-part of application Ser. No. 08/439,727 filed May 12, 1995.

FIELD OF THE INVENTION

The field of art to which the invention relates comprises apparatus for the venting of an enclosed housing to atmosphere.

1. Background of the Invention

Many enclosed housings; particularly as utilized in the field of instrumentation, are subject during operation to the possibility of internal pressure build-up. Instrument failure within the housing can, if not accommodated, cause excessive internal build-up of pressure to occur at dangerous levels. On the otherhand, even environmental temperature change can cause minor pressure increases within the casing, that adversely affects instrument accuracy. As a consequence, suitable venting becomes necessary in order to avoid such adverse effects.

2. Description of the Prior Art

Apparatus for effecting pressure relief from various devices is well known and widely available as exemplified by U.S. Pat. Nos. 3,874,241; 4,051,730; 4,449,412; 5,012,678; 4,064,890; 2,522,007; 3,701,284 and German patent G.900309636.

Typically, such relief devices as disclosed in the foregoing patents are operable for controlled relief of an internal pressure build-up to excessive levels that might, for example, be incurred from equipment failure within an operating pressure gauge. The control device serves to dissipate the excess pressure in a manner avoiding destruction of the instrument and thereby avoid potential bodily injury that could otherwise result to persons in the vicinity. Such devices are generally operative to fracture or expell and thereby relieve fluid pressure at a predetermined operative setting enabling excess internal pressure to escape safely to atmosphere.

Being operative at a predetermined level of excess pressure, such devices do not allow for distortion inaccuracies imposed on the operational structure of the instrument per se and occasioned by increasing trapped pressures at values above atmospheric pressure but below the operative setting for relieving excess pressure. Moreover, many users prefer to accommodate one or both of the above relief conditions with a manual programming depending on the type of application for which the instrument is to be utilized and including the option of change. At the same time, it is preferred that a venting device for that purpose be characterized by a relatively low profile and a relatively low cost to increase suitability for the markets served by such instruments.

Prior attempts for addressing the above have included removal of a sealing plug which not only tends to get lost but can incur immediate internal exposure from both environmental moisture and/or other contaminating/corrosive elements. Still another approach has been to puncture the sealing plug which has generally been regarded as unsatifactory, since it can prove difficult to a restore the plug to a hermetically sealed state. Substituting a non-sealing plug for a sealing plug has likewise been tried, but tends to be inconvenient from the standpoint of both cost and time. Sealing a vent hole by taping or the like has likewise proved less than reliable in view of an inability to obtain satisfactory tape adherence on liquid filled gauges.

Despite recognition of the foregoing, a ready solution therefore has not heretofore been known.

Objects of the Invention

It is an object of the invention to provide a novel vent plug for relieving internal pressure from within an enclosed instrument casing.

It is a further object of the invention to effect the previous object with a vent plug characterized by a dual operational mode and a low profile.

It is a still further object of the invention to effect the previous object with a vent plug that is relatively uncostly to fabricate while affording on-site flexibility and convenience of operation.

SUMMARY OF THE INVENTION

This invention relates to a vent plug assembly for relieving pressure build-up from within an instrument casing such as a pressure gauge. More specifically, the invention relates to a vent plug assembly having a dual mode of operation optionally enabling a predetermined relatively high pressure relief or an on-site alternative providing continuous relief at any and all pressures over ambient likely to be encountered.

The foregoing is achieved in accordance with the invention by the vent plug assembly hereof comprising a circular molded body adapted to be securely installed and internally exposed in an aperture provided in a exterior surface of the instrument casing. The body is preferably formed of a hard rubber compound such as Buna-N that includes a transverse thru-bore and dependent recess axially aligned on complementary opposite sides of the body center. A raised button or knob aligned axially therewith and/or embossed text at the circumferential edge of the body provides an oriented indicia for a plug member to be received as will be understood.

A plug member cooperatively interfits with the body and is comprised of a molded thermoplastic composition such as R4 Ryton. Forming the plug is an elongated top plate adapted for overlying positioning relative to the body. One end of the top plate terminates in an arrow-like configuration, which in cooperation with the body text defines an indicia indicator of the open or closed position of the vent plug assembly. On its underside, the plug includes a pair of laterally depending cylindrically tubular stubs for interfitting within the thru bore and recess of the body. One of the stubs includes an internally vertical blind recess while the other includes a bore extending into and through the top plate. The stubs are complementarily spaced as to be adapted for interchangeable insertion within the thru-bore and recess of the body by manually lifting and then reversing the top plate end-for-end.

By means of a force fit effected by the slightly oversized stubs relative to the bore and recess of the body, and with the thru-bores respectively mis-matched in the "closed" position a limited pressure build-up can occur within the instrument case. On reaching a predetermined pressure value, either the plug alone or the assembly is expelled to thereby exhaust any internal pressure build-up from within. This typically occurs at about 30 psig. By optionally matching the thru-bores of the body and plug in the "open" position, a continuous vent is afforded enabling atmospheric pressure to be maintained within and without the instrument case.

Being that the plug can be reversibly set into the body with the respective thru-bores matched or unmatched, a simple dual mode operation is thereby afforded. Yet when installed, the exposed vertical profile can be as little as $\frac{1}{32}$ inches.

BRIEF DESCRIPTION OF THE DRAWINGS

FIG. 1 is a plan view of a pressure gauge in a panel mount containing the dual mode vent plug hereof;

FIGS. 2A and 2B are front elevations of the vent plug hereof in the open and closed positions respectively;

FIG. 3 is a sectional view as seen substantially along the lines 3—3 of FIG. 2B;

FIG. 4 is a top side plan view of the plug body;

FIG. 5 is a sectional elevation as seen substantially along the lines 5—5 of FIG. 4;

FIG. 6 is a sectional elevation as seen substantially along the lines 6—6 of FIG. 4;

FIG. 7 is a plan view of the vent plug hereof; and

FIG. 8 is a sectional view as seen substantially along the lines 8—8 of FIG. 7.

DESCRIPTION OF THE PREFERRED EMBODIMENT

In the description which follows, like parts are marked throughout the specification and drawings with the same reference numerals respectively. The drawing figures are not necessarily to scale and in certain views, parts may have been exaggerated for purposes of clarity.

Referring now to the drawings, there is illustrated in FIG. 1 an instrument exemplified as a pressure gauge, designated 10, mounted on a panel front 12. The gauge includes a conventional socket 14 through which fluid pressure 16 is received for pressure monitoring by gauge 10. Surrounding the internal operating components (not shown) of the gauge is the casing 18 having an aperture 20 containing the dual mode vent plug assembly 22 hereof in a seal tight relation. The plug, unlike its showing in FIG. 1, is preferably positioned in the 12:00 o'clock relation.

Comprising the vent plug assembly, as best seen in the remaining FIGS. 2–8, is a body 24 configured to receive an overlying interfitting and cooperating plug 26. Comprising the body 24 is an annular rim 28 defining an annular shoulder 30 adapted to be snugly received in a pressure tight relation within aperture 20 of casing 18. Within the body, there is located on common center line 31 and complementary on opposite sides of transverse center line 32, a vertical thru-bore 34 on center line 56 and a deep recess 36 on center line 58 for receipt of plug 26 as will be described. Also located on center line 31 at the circumferential edge of rim 28 is a small diameter upright button or knob 38 adjacent engraved text 29 and opposite from engraved text 33 for defining a reference indicia as will be understood. On the underside thereof for effecting weight reduction are blind oval upright recesses 40 and 42.

Plug 26 hereof includes a horizontal top plate 44 which on its underside laterally supports a pair of cylindrical and tubular stubs 46 and 48 on center line 31 and similarly located on center lines 56 and 58. Both stubs have a slightly tapered lead-in and include a central upright recess extending from bottom plane 50. Stub 48 also includes a thru-bore 52 communicating with the recess thereat and extending through the top surface of plate 44. Top plate 44, as best seen in FIG. 7, includes a converging arrow-like end 45 for indicating open or closed plug orientation with respect to body button 38 and/or texts 29 and 33. Each of stubs 46 and 48 has a depth of about 3/32 inches from the undersurface of top plate 44 and an outside diameter of about 1/8 inch.

For these purposes, the respective center lines 56 and 58 of stubs 46 and 48 dimensionally correspond with the same center lines of body thru-bore 34 and recess 36. The outside diameter of the stubs however, are about 1/64th of an inch greater than the internal diameter of bore 34 and recess 36. In this manner, inserting the plug stubs into the receiving openings of the body, as best seen in FIG. 3, effects a forced interference fit therebetween. As thereshown, pointer 45 is in the closed position with stub 46 received within body thru-bore 34 while thru-bore stub 48 is received in body recess 36. By virtue of the difference in outside dimension of the stubs versus the body openings, a tight force fit is effected that maintains their assembly against internal case pressures. At the same time, an interference fit between the inside diameter of aperture 20 and the outside diameter of shoulder 30 serves to resist assembly blowout until a predetermined blowout pressure is incurred. At that pressure level and above, the underlying pressure on assembly 22 will cause the assembly to expel from case aperture 20 and thereby ventilate internal pressure. Optionally, plug 26 can be caused to expel from body 24.

The blow-out pressure is primarily dependent on (a) the diametral interference between the outside diameter of body shoulder 30 (measured as an assembly prior to insertion into the case) and the internal diameter of case aperture 20; (b) the hardness of the body composition; and (c) the burr condition, if any, about aperture 20 as exemplified by the following tables:

TABLE I

| Diametral Interference (inch) | Blow-out pressure (psig) |
| --- | --- |
| 0.01 | 10 |
| 0.017 | 25 |
| 0.02 | 40 |

TABLE II

| Body Hardness-Shore "A" | Blow-out pressure (psig) |
| --- | --- |
| 60 | 20 |
| 80 | 30 |
| 90 | 48 |

Where continous venting is preferred; the plug can be manually lifted out, as shown by arrow 54 by finger gripping the longitudinal side edges of plug 26. Once removed, the plug can conveniently be reversed and reinserted on-site end-for-end with arrow 45 pointed at text 29 in the position of FIG. 2(a) enabling plug bore 52 to continuously communicate with body bore 34. Should a subsequent reversal be desired, the plug need only be removed and reversibly inserted end-for-end as before.

By the above description there is disclosed a novel vent plug construction characterized by a low vertical profile and easy interchangeability between an open and closed relation respecting the enclosure within casing 18. Being manually interchangeable affords a flexibility to the user of such equipment to either continuously vent the interior of the case or protect the instrument against high pressure blowout whichever is preferred. At the same time, only one vent plug assembly is required such that the customer himself determines the manner by which the plug is to be utilized on site.

Since many changes could be made in the above construction and many apparently widely different embodiments of this invention could be made without departing from the scope thereof, it is intended that all matter contained in the drawings and specification shall be interpreted as illustrative and not in a limiting sense.

In the claims:

1. A vent plug assembly for relieving fluid pressure from within an enclosed instrument casing comprising:

a body adapted to be installed in a secured relation within an aperture defined in the casing of the instrument with which said vent plug assembly is to be utilized, said body including at least one transversely extending thru-bore and at least one blind recess inwardly extending parallel and at a location removed from said thru-bore, with said thru-bore and said recess being of like sectional configuration and dimension;

a removable plug defining a top plate having at least a pair of dependent stubs of like spacing and sectional configuration as the thru-bore and recess of said body with one of said stubs being blind to fluid flow and the other of said stubs defining a thru-bore for communicating fluid flow; and said plug being interchangeably insertable selectively onto said body with either the one of said stubs or the other of said stubs received in the thru-bore of said body.

2. A vent plug assembly in accordance with claim 1 in which when the other of said plug stubs is received in the thru-bore of said body, said vent plug affords continous venting from internally of the enclosed casing.

3. A vent plug assembly in accordance with claim 1 in which said body is secured in an interference fit within the aperture of said instrument casing and when said one plug stub is received within the thru-bore of said body, said vent plug assembly is displaceable from said casing aperture outwardly in response to a predetermined value of pressure build-up being incurred internally of said casing.

4. A vent plug assembly in accordance with claim 3 in which the exterior cross-sectional dimension of said plug stubs is slightly greater than the internal cross-sectional dimension of the thru-bore and recess of said body for said plug to incur a forced fit when inserted into said body.

5. A vent plug assembly in accordance with claim 3 in which the value of build-up pressure at which said vent plug assembly is displaceable is correlated to the degree of interference incurred in said interference fit.

6. A vent plug assebly in accordance with claim 3 in which the value of build-up pressure at which said vent plug assebly is displaceable is correlated to the hardness value of said body.

7. A vent plug assembly in accordance with claim 1 including indicia on the exterior of said body and on the exterior of said plug for indicating relative placement between the stubs of said plug and the thru-bore and recess of said body.

8. A vent plug assembly in accordance with claim 7 in which the indicia on said plug comprises a distinctive configuration on one end of said top plate positionable at or removed from the indicia on said body to reflect an open or closed position of said plug with respect to continuous venting through said body.

9. A vent plug assembly in accordance with claim 8 in which the distinctive configuration of said plug indicia comprises a converging arrow-like end of said top plate.

* * * * *